_United States Patent Office_

3,369,020
Patented Feb. 13, 1968

3,369,020
1,4-DIFORMYL-2,3,5,6-TETRAKIS(DIFLUOR-AMINO)PIPERAZINES
Alan Norman Ferguson, Irvine, and Godfrey Fort, Ardrossan, Scotland, assignors, by mesne assignments, to the United States of America as represented by the Secretary of the Navy
No Drawing. Filed July 28, 1965, Ser. No. 475,601
Claims priority, application Great Britain, Aug. 6, 1964, 32,125/64
7 Claims. (Cl. 260—268)

This invention relates to a novel compound, 1,4-diformyl-2,3,5,6-tetrakis(difluoramino)piperazine and a process for its preparation. This compound is a useful energetic constituent of high energy propellant compositions. It is especially useful in this field of application because, unlike many of the difluoramino compounds hitherto proposed, it does not show any marked tendency to sublime and it can be prepared from readily available starting materials.

In accordance with the process of the invention the compound 1,4 - diformyl-2,3,5,6-tetrakis(difluoramino) piperazine is prepared by reacting 1,4-diformyl-2,3,5,6-tetrahydroxy-piperazine or an ester thereof with difluoramine in an inert atmosphere in presence of an acidic condensing agent.

The term "inert atmosphere" is used herein to mean an atmosphere free from any constituent, such as oxygen, which reacts with difluoramine.

The reaction of the tetrahydroxy compound may be represented as follows:

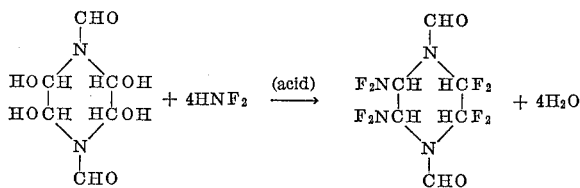

1,4-diformyl-2,3,5,6-tetrahydroxypiperazine used as starting material in the process of the invention may be prepared by reacting glyoxal with formamide in the presence of an alkaline catalyst as described in our co-pending application Ser. No. 472,717, filed July 16, 1965. The ester derivatives are readily prepared from the tetrahydroxy compound by esterifying the hydroxyl groups by standard procedures. A convenient ester of 1,4-diformyl-2,3,5,6-tetrahydroxypiperazine for use in the reaction is 1,4-diformyl-2,3,5,6-acetoxypiperazine.

Convenient acidic condensing agents include halogeno sulphonic acids, concentrated sulphuric acid and oleum. Sulphuric acid is especially convenient because of its solvent action on 1,4-diformyl-2,3,5,6-tetrahydroxypiperazine.

1,4-diformyl-2,3,5,6-tetrahydroxypiperazine is not entirely stable when dissolved in concentrated acid and it is therefore preferred to add the acidic condensing agent to a mixture of difluoramine and 1,4-diformyl-2,3,5,6-tetrahydroxypiperazine. Using this procedure the reaction proceeds as the 1,4 - diformyl - 2,3,5,6 - tetrahydroxypiperazine dissolves in the acidic condensing agent and the product separates from the reaction medium as a crystalline solid.

The reaction may conveniently be carried out either under autogenous pressure at room temperature or under atmospheric pressure at a reduced temperature. A convenient procedure is to carry out the reaction under conditions of difluoramine reflux at atmospheric pressure, the reflux temperature being about −23° C.

Although purified 1,4-diformyl-2,3,5,6-tetrahydroxypiperazine is normally used to prepare the 1,4-diformyl-2,3,5,6-tetrakis(difluoramino)piperazine, the reaction can also be carried out using as the starting material a crude mixture of glyoxal/formamide condensation products in which diformyl-tetrahydroxypiperazine may occur to the extent of less than 50% in admixture with other condensation products.

The invention is further illustrated by the following examples in which all parts are by weight.

EXAMPLE 1

In a 3-necked-flask were placed 4.57 parts of 1,4-diformyl-2,3,5,6-tetrahydroxypiperazine which had been purified by recrystallisation from boiling water until it showed no absorption band at 6.4µ in its infra-red spectrum. The flask was fitted with a reflux condenser cooled with solid carbon dioxide/acetone, a gas inlet tube extending to the bottom of the flask and a tap-funnel for addition of sulphuric acid. A mixture of nitrogen and difluoramine was passed through the gas inlet tube until 40 parts of difluoramine had been added. The flow of nitrogen was maintained and the difluoramine allowed to reflux for 1 hour. 55 parts of 96–98% sulphuric acid were added from the tap-funnel and the mixture reacted with continuous refluxing of the difluoramine for 3 hours. The condenser temperature was allowed to rise to room temperature and unreacted difluoramine was vented off in a stream of nitrogen. The solid difluoraminated product was insoluble in the sulphuric acid and was isolated by pouring on to excess crushed ice, filtering off the product and washing thoroughly with cold water. After drying in a vacuum desiccator over phosphorus pentoxide, 5.2 parts (68% theory) of white, crystalline product melting at 168–170° C. were obtained. The product was found to contain C, 21.5%; H, 1.79%; N, 23.4%; F, 43.3%. Diformyl-tetrakis (difluoramino)piperazine ($C_6H_6O_2N_6F_8$) requires C, 20.8%; H, 1.73%; N, 24.3%; F, 43.9%. The molecular weight, determined by an ebullioscopic method in acetone, was found to be 342; the calculated molecular weight for $C_6H_6O_2N_6F_8$ is 346.

The product dissolved readily in acetonitrile, nitromethane and acetone. After purification by dissolving in acetone and reprecipitating with water the product melted at 171–172° C.

The infra-red spectrum of a dispersion of the product in a high-boiling petroleum fraction showed strong absorption at 5.9, 8.2, 10.0 and 11.4µ, medium absorption at 7.0, 7.2, 7.65, 7.95 and 15.0µ, and weak absorption at 7.25, 10.4, 12.15 and 13.8µ. The band at 11.4µ is characteristic of an NF linkage in a C—NF$_2$ group.

The explosion temperature of the product, heated at a rate of 5° C./minute, was 202° C. The product burned rapidly when ignited. In an impact sensitivity test a violent explosion was obtained when a ½ kg. mild steel hammer was dropped on to a thin layer of the product on a mild steel anvil from a height of 10 centimetres, but no explosions were obtained when the height of drop was reduced to 5 centimetres.

EXAMPLE 2

4.66 parts crude diformyl-tetrahydroxypiperazine which showed a strong infra-red absorption band at 6.4µ were reacted with difluoramine in presence of sulphuric acid by the method described in Example 1. 1.79 parts of a white crystalline product melting at 160–162° C. were obtained. It was found to contain C, 21.1%; H, 1.9%; 9, 23.8%; F, 43.7%. The infra-red spectrum was similar to that described for the product of Example 1.

EXAMPLE 3

6.16 parts of tetrahydroxypiperazine were reacted with 40 parts of difluoramine in the manner described in Example 1 except that the condensing agent was 77 parts of 20 wt. percent oleum instead of sulphuric acid and that the difluoramine reflux was continued for 11 hours after addition of the condensing agent before the difluoramine was vented off, after which the reaction mixture was allowed to remain overnight at room temperature in an atmosphere of nitrogen before pouring it on to crushed ice and isolating the product.

7.14 parts of 1,4-diformyl-2,3,5,6-tetrakis(difluoramino)piperazine were obtained and identified by means of the infrared spectrum.

EXAMPLE 4

6.76 parts of tetrahydroxypiperazine were reacted with 40 parts of difluoramine and the product isolated as described in Example 3 except that the condensing agent was 70 parts of fluorosulphonic acid.

8.90 parts of 1,4-diformyl-2,3,5,6-tetrakis(difluoramino)piperazine were obtained and identified by the infrared spectrum.

EXAMPLE 5

6.70 parts of tetrahydroxypiperazine were reacted with 40 parts of difluoramine and the product isolated as described in Example 3 except that the condensing agent was 71 parts of chlorosulphonic acid and the period of difluoramine reflux after addition of the condensing agent was 9 hours.

5.80 parts of 1,4-diformyl-2,3,5,6-tetrakis(difluoramino)piperazine were obtained and identified by the infrared spectrum.

EXAMPLE 6

2.45 parts 1,4-diformyl-2,3,5,6-tetra-acetoxyperazine were reacted with 40 parts of difluoramine in presence of 55 parts sulphuric acid for 5½ hours by the method described in Example 1, and 1.78 parts (79% of theory) of 1,4-diformyl-2,3,5,6-tetrakis(difluoramino)piperazine were isolated as described in that example. The infra-red spectrum of the product was similar to those of the products from Examples 1 and 2.

What we claim is:

1. 1,4 - diformyl-2,3,5,6-tetrakis(difluoramino)piperazine.

2. A process for the preparation of 1,4-diformyl-2,3,5,6-tetrakis(difluoramino)piperazine which comprises reacting a piperazine compound selected from the group consisting of 1,4-diformyl-2,3,5,6-tetrahydroxyperazine and acetate esters thereof with difluoramine in an inert atmosphere in presence of an acidic condensing agent.

3. A process as claimed in claim 2 wherein the ester is 1,4-diformyl-2,3,5,6-acetoxypiperazine.

4. A process as claimed in claim 2 wherein the acidic condensing agent comprises a compound selected from the group consisting of halogeno sulphonic acid, concentrated sulphuric acid and oleum.

5. A process as claimed in claim 4 wherein the acidic condensing agent comprises a compound selected from the group consisting of fluorosulphonic acid and chlorosulphonic acid.

6. A process as claimed in claim 2 wherein the reaction is carried out under conditions of difluoramine reflux at atmospheric pressure.

7. A process as claimed in claim 2 wherein the acidic condensing agent is added to a mixture of difluoramine and the piperazine compound.

References Cited

UNITED STATES PATENTS 3,112,155  11/1963  Vail et al. _____ 260—268

OTHER REFERENCES

Mitsch, J. Am. Chem. Soc., vol. 87, pp. 328 to 333, Jan. 20, 1965.

NICHOLAS S. RIZZO, *Primary Examiner.*

B. R. PADGETT, CARL D. QUARFORTH, *Examiners.*

L. A. SEBASTIAN, D. DAUS, *Assistant Examiners.*